Oct. 16, 1945.  M. A. PUCKETT  2,386,908
ROPE CLAMP
Filed July 29, 1943  2 Sheets-Sheet 2
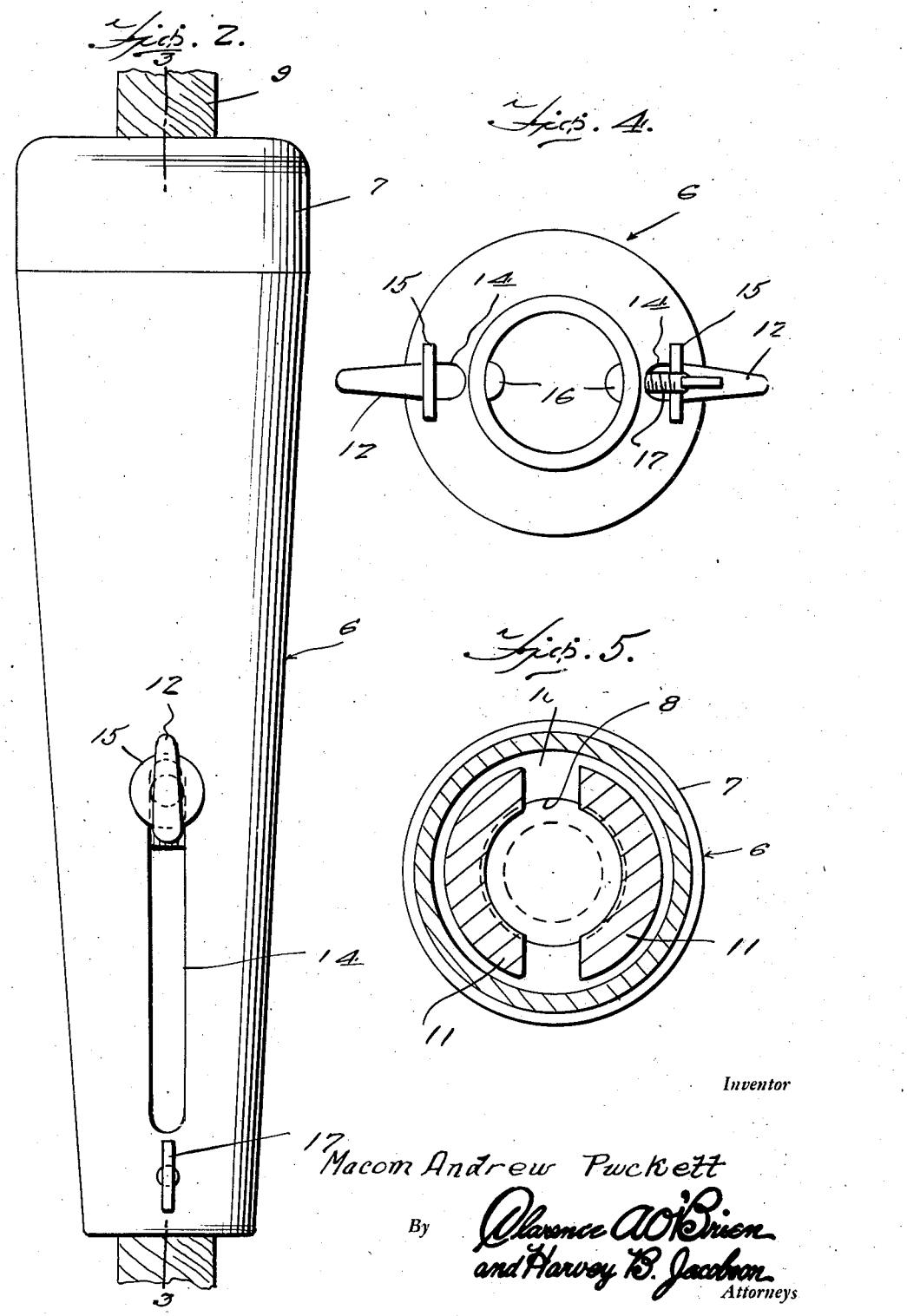
Inventor
Macom Andrew Puckett
By Clarence A. O'Brien
and Harvey B. Jacobson
Attorneys Patented Oct. 16, 1945

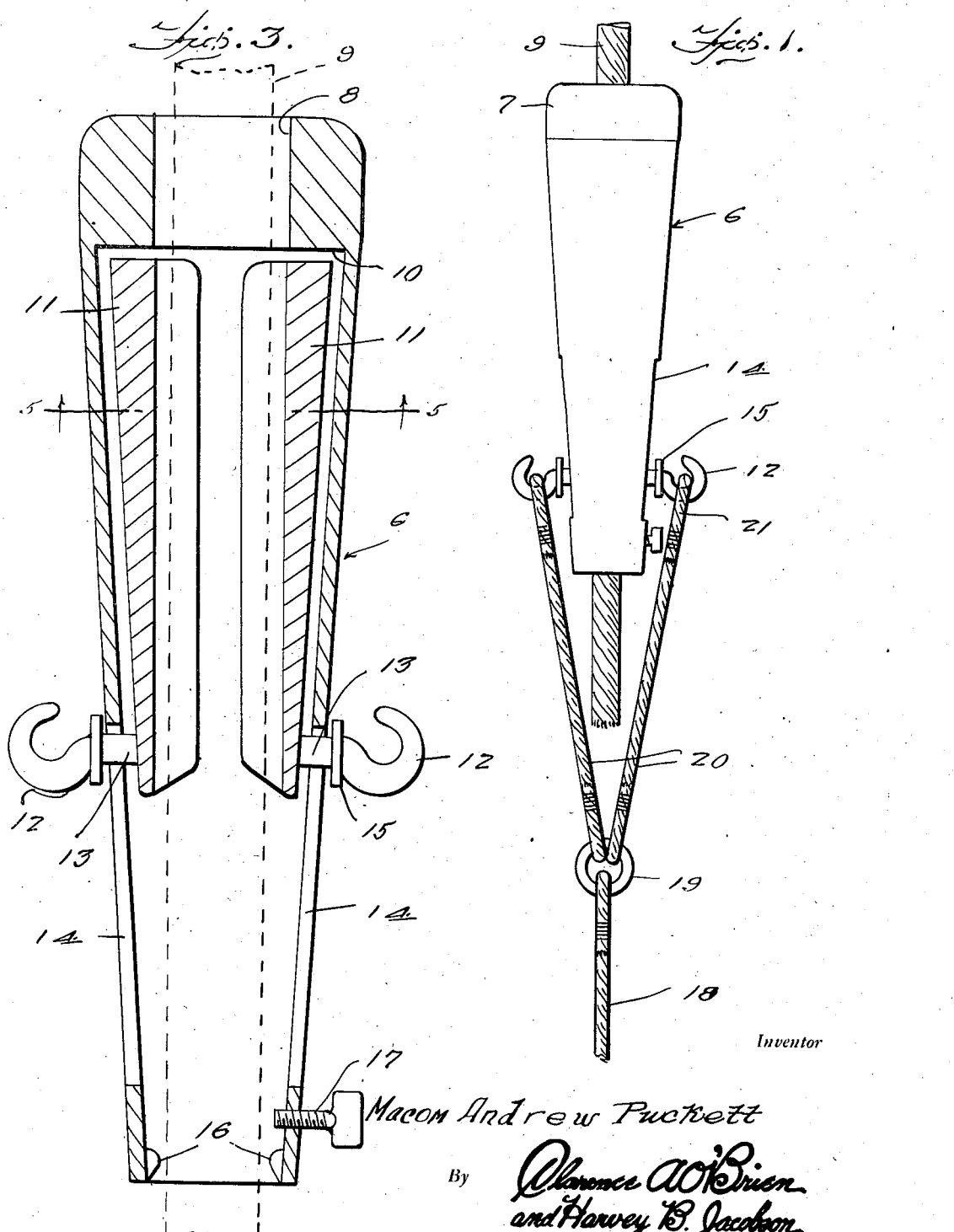

2,386,908

UNITED STATES PATENT OFFICE 2,386,908

ROPE CLAMP

Macon A. Puckett, Marietta, Ga.

Application July 29, 1943, Serial No. 496,630

2 Claims. (Cl. 24—136)

This invention relates to a novel and improved clamp for use in connection with ropes, wire cables and the like, and the principal purpose of the invention is to generally improve upon coupling and clamping devices in this general category by providing a structural adaptation which, it is believed, more aptly fulfills the requirements of the trade and otherwise better serves the intended purposes for which the invention has been expressly devised.

Needless to say, I am aware that the art to which the invention relates is indeed active; that numerous structures have been marketed and patented to achieve somewhat similar aims. However, and despite such previous accomplishments and admitted development work, I have evolved and produced an improved structural adaptation which, it is felt, enables me to achieve what is wanted, this through the medium of a construction which is distinct and otherwise suitably designed for desired results.

In carrying out the chosen and desired principles of the invention I have evolved and produced a simple and economical structure, one which is reliable, expedient for desired uses and readily usable to temporarily and adjustably connect one cable or rope with another, this without the necessity of knotting and tying said ropes together, as is ordinarily done.

Other features and advantages of the invention will become more readily apparent from the following description and the accompanying illustrative drawings.

In the drawings, wherein like numerals are employed to designate like parts throughout the views—

Figure 1 is a side elevational view of a rope or cable clamp constructed in accordance with the principles of this invention showing the manner in which said clamp is applied to the rope and how the companion rope is adjustably and separably joined thereto.

Figure 2 is a side elevational view illustrating the external configuration, with the parts on a scale sufficiently large for studious consideration.

Figure 3 is a longitudinal sectional view on the plane of the line 3—3 of Figure 2, parts appearing in elevation.

Figure 4 is an end elevation, that is, a view observing Figure 2 from bottom to top.

Figure 5 is a cross section on the plane of the line 5—5 of Figure 3 looking in the direction of the arrows.

Referring now to to the drawings by distinguishing reference numerals it will be observed that the principal part of the device is denoted by the numeral 6. This is in the form of a longitudinally elongated and tapered shell or body, the same being hollow and generally cylindrical in cross section. The upper end portion 7 is thickened as shown to define a passage 8 for the main rope 9 and an annular ledge or stop shoulder 10 for the enclosed rope gripping slips 11. These slips constitute rope engaging jaws and have their contiguous or opposed faces formed with somewhat semi-circular channels to partially embrace the adjacent portions of the rope. The lower ends of the slips have hooks 12 attached thereto, the shank portions 13 extending through diametrically opposed longitudinal slots 14 formed in the lower half of the shell. It will be observed that at the junctural portion between the shank and the body of the hook there exists a flange 15, this being located exteriorly of the slotted portions of the shell or body 6. In addition at its lower end said body 6 has internal diametrically opposed lugs 16 which constitute checks or stops to limit the downward movement of the slips 11, whereby to coordinate the shanks 13, slots 14 and stops 16 in stabilizing the parts. The numeral 17 designates a set screw whose threaded shank projects into the interior of the shell just above the stops 16. This is for purposes of engaging the adjacent portion of the rope and forcing it over against the opposed wall of the shell, whereby to connect the shell temporarily with the rope as a unit. Once this temporary connection is made, the slips 11 can move relatively to the rope and shell.

The complemental rope 18, which is smaller in diameter than the first-named rope 9, is provided with a ring 19 carrying auxiliary or ancillary components 20, these having eyes 21 at their outer or free ends for releasable engagement with the adapter hooks 12. It is evident, therefore, that with the rope 9 fastened in the shell 6 by way of the screw 17 when an endwise pull is exerted on the rope 18, this, through the medium of the auxiliary ropes 20, pulls upon the hooks, the hooks in turn pulling upon the slips 11. The slips being tapered and the shell being tapered it is evident that said slips wedge tightly against diametrically opposite sides of the rope and thus produce the desired coupling between said ropes 9 and 18.

As before indicated the invention is a heavy duty device. It is sturdy and reliable and fulfills the purposes for which it is intended. There are no parts likely to get out of order and by using it, it is unnecessary to knot and otherwise tie ropes and cables together as is commonly done in the trade. Everything considered, it is believed that the invention aptly fulfills the purposes for which it is especially intended.

It is thought that persons skilled in the art to which the invention relates will be able to obtain a clear understanding of the invention after considering the description in connection with the drawings. Therefore, a more lengthy description is regarded as unnecessary.

Minor changes in shape, size, and rearrangement of details coming within the field of invention claimed may be resorted to in actual practice, if desired.

Having described the invention, what is claimed as new is:

1. A rope clamp comprising a hollow shell defining a longitudinally extending chamber tapered towards its lower end and through which a rope or cable is adapted to extend, a head for the upper end of said shell formed with a rope passage communicating with the upper end of said chamber, the wall of said shell being formed with longitudinally extending slots, transversely arcuate rope engaging jaws in said chamber slidable longitudinally therein and moved toward each other by cam action of the wall as they move downwardly, hooks disposed externally of said shell and having shanks passing through the slots and fixed to lower end portions of said jaws, said hooks being engageable by an auxiliary line and their shanks constituting means for guiding and limiting vertical movement of the jaws, internal lugs carried adjacent the lower end of the shell for limiting downward movement of the jaws, and a set screw threaded through the shell between the lugs and lower ends of said slots for exerting binding action upon a rope passing through the shell and between the jaws.

2. A rope clamp comprising a hollow shell defining a chamber tapered towards its lower end and through which a rope is adapted to pass, transversely arcuate jaws within said chamber slidable longitudinally therein and conforming to the taper of the chamber, the wall of said shell being formed with diametrically opposed slots extending longitudinally of the shell, and hooks disposed externally of the shell in radial relation thereto for engagement by an auxiliary line, said hooks having shanks extending through the slots and fixed to said jaws at the lower ends thereof.

MACON A. PUCKETT.